(12) United States Patent
Edwards et al.

(10) Patent No.: US 12,154,098 B2
(45) Date of Patent: Nov. 26, 2024

(54) TRANSACTION CARD WITH MODIFICATION AREA

(71) Applicant: Capital One Services, LLC, McLean, VA (US)

(72) Inventors: Joshua Edwards, Philadelphia, PA (US); Tyler Maiman, Melville, NY (US); Kevin Osborn, Newton Highlands, MA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/964,239

(22) Filed: Oct. 12, 2022

(65) Prior Publication Data

US 2024/0127221 A1   Apr. 18, 2024

(51) Int. Cl.
*G06Q 20/34* (2012.01)
*B32B 5/16* (2006.01)
*B32B 5/22* (2006.01)

(52) U.S. Cl.
CPC ............ *G06Q 20/355* (2013.01); *B32B 5/16* (2013.01); *B32B 5/22* (2013.01); *B32B 2264/101* (2013.01); *B32B 2264/202* (2020.08)

(58) Field of Classification Search
CPC .............. G06Q 20/341; G06Q 20/355; B32B 2425/00; B32B 5/16; B32B 5/22; B32B 5/30; B32B 27/20; B32B 2264/101; B32B 2264/10; B32B 2264/202; B32B 2264/2032
See application file for complete search history.

(56) References Cited

U.S. PATENT DOCUMENTS

| | | | |
|---|---|---|---|
| 11,551,625 B1* | 1/2023 | Staton | F21S 43/255 |
| 2001/0046081 A1* | 11/2001 | Hayashi | G09F 9/372 |
| | | | 428/327 |
| 2006/0065741 A1* | 3/2006 | Vayssiere | G06Q 20/341 |
| | | | 235/492 |
| 2006/0262367 A1* | 11/2006 | Hattori | B42D 25/328 |
| | | | 359/15 |

(Continued)

FOREIGN PATENT DOCUMENTS

| | | | | |
|---|---|---|---|---|
| CN | 106536184 A | * | 3/2017 | B05D 5/061 |
| EP | 3543031 B1 | * | 11/2023 | B32B 27/18 |

OTHER PUBLICATIONS

Szurdoki, "A duplexed microsphere-based fluorescent immunoassay" (Year: 2001).*

(Continued)

*Primary Examiner* — Thien T Mai
(74) *Attorney, Agent, or Firm* — KDW Firm PLLC

(57) ABSTRACT

Provided are approaches for customizing transaction cards using a pressure sensitive modification area. In some approaches, a transaction card may include a body having a first main side opposite a second main side, wherein a chip is coupled to the first main side of the body, wherein a first outer layer extends along the first main side, and wherein a second outer layer extends along the second main side. The transaction card may further include an internal layer between the first and second outer layers, and a plurality of microspheres and a pigmented substance positioned between the internal layer and the first outer layer.

20 Claims, 4 Drawing Sheets

(56) References Cited

U.S. PATENT DOCUMENTS

2007/0273956 A1* 11/2007 Kim .................. G09G 3/344
                                                      359/296
2017/0060263 A1*  3/2017 Birecki ................ G06F 3/03
2018/0267381 A1*  9/2018 Leoni ................. G02F 1/1676

OTHER PUBLICATIONS

Zhang, "Novel preparation of an ancient ceramic pigment BaCuSi4O10 and its performance investigation" (Year: 2018).*

* cited by examiner

TRANSACTION CARD WITH MODIFICATION AREA

FIELD

Embodiments of the present disclosure relate to transaction cards and, more particularly, to transaction cards including a customizable modification area.

BACKGROUND

Transaction cards, such as credit cards and debit cards, typically contain account information such as the account number, owner's name, expiration date, etc. This information may be provided in different formats, and at different positions along the card. Transaction cards may also include one or more aesthetic features, which may be selected to increase brand or product recognition, and/or user appeal. Typically, the design cannot be customized or personalized once the card is constructed, however.

It is with respect to this and other considerations that the present improvements are provided.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

In at least one approach according to the disclosure, a transaction card may include a body having a first main side opposite a second main side, wherein a chip is coupled to the first main side of the body, wherein a first outer layer extends along the first main side, and wherein a second outer layer extends along the second main side. The transaction card may further include an internal layer between the first and second outer layers, and a plurality of microspheres and a carrier positioned between the internal layer and the first outer layer.

In another approach according to the disclosure, a transaction card may include a body having a first main side opposite a second main side, wherein an identification chip is coupled to the first main side of the body, wherein a first outer layer extends along the first main side, and wherein a second outer layer extends along the second main side. The transaction card may further include an internal layer between the first and second outer layers, wherein the internal layer defines a modification area, and a plurality of microspheres and a pigmented coating located in the modification area.

In yet another approach according to the disclosure, a customizable transaction card may include a body having a first main side opposite a second main side, wherein a chip is coupled to the first main side of the body, wherein a first outer layer extends along the first main side, and wherein a second outer layer extends along the second main side. The customizable transaction card may further include an internal layer between the first and second outer layers, and a plurality of glass microspheres and a pigmented coating positioned between the internal layer and the first outer layer.

BRIEF DESCRIPTION OF THE DRAWINGS

The accompanying drawings illustrate example approaches of the disclosure, including the practical application of the principles thereof, as follows.

Figure 1A:
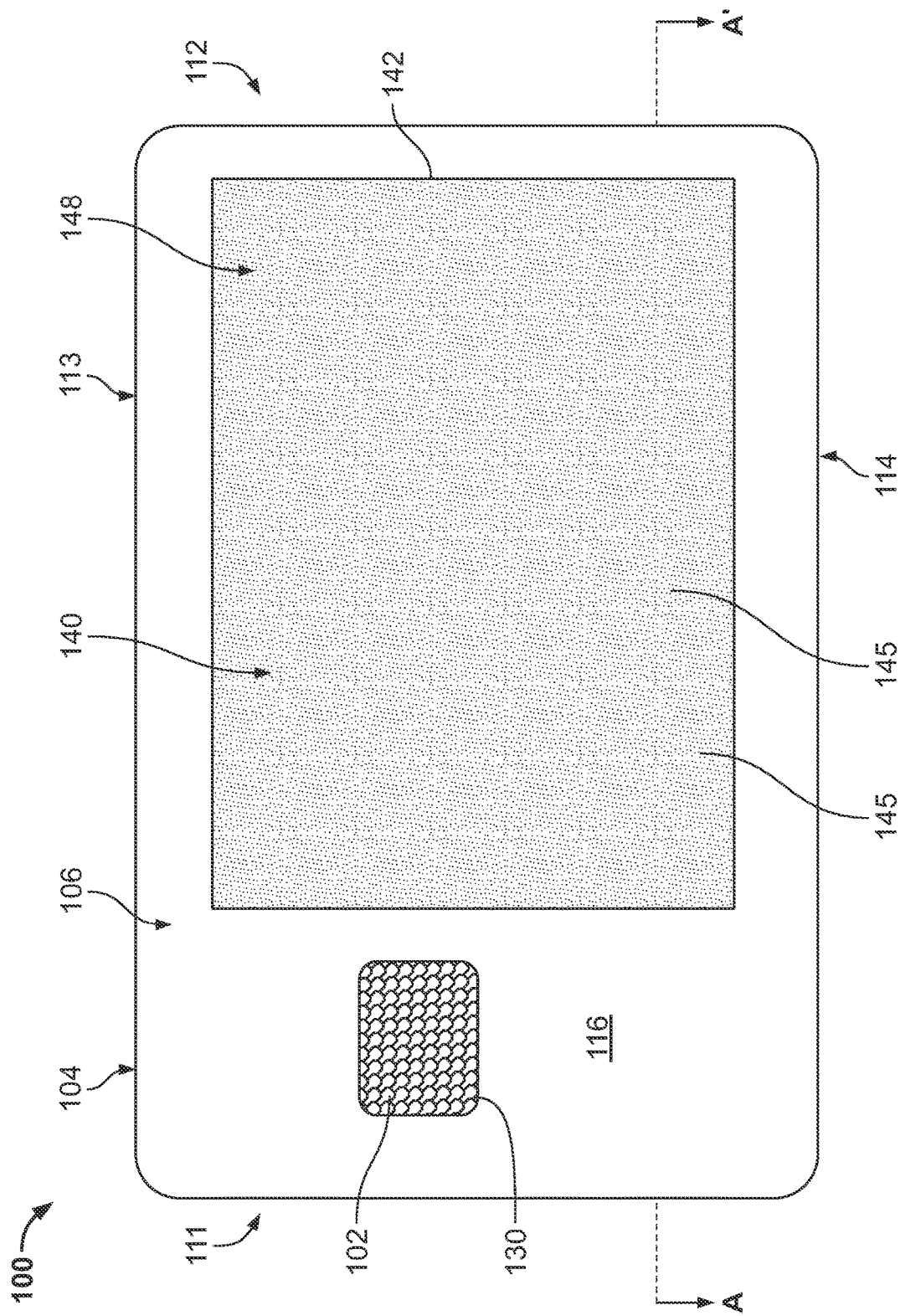
FIG. 1A is a top view illustrating a transaction card, in accordance with embodiments of the present disclosure.

The drawings are not necessarily to scale. The drawings are merely representations, not intended to portray specific parameters of the disclosure. The drawings are intended to depict example embodiments of the disclosure, and therefore are not be considered as limiting in scope. In the drawings, like numbering represents like elements.

Furthermore, certain elements in some of the figures may be omitted, or illustrated not-to-scale, for illustrative clarity. The cross-sectional views may be in the form of "slices", or "near-sighted" cross-sectional views, omitting certain background lines otherwise visible in a "true" cross-sectional view, for illustrative clarity. Furthermore, some reference numbers may be omitted in certain drawings.

DETAILED DESCRIPTION

The present embodiments will now be described more fully hereinafter with reference to the accompanying drawings, where some embodiments are shown. The subject matter of the present disclosure may be embodied in many different forms and are not to be construed as limited to the embodiments set forth herein. These embodiments are provided so this disclosure will be thorough and complete, and will fully convey the scope of the subject matter to those skilled in the art. In the drawings, like numbers refer to like elements throughout.

Embodiments herein are directed to customizable transaction cards including a pressure sensitive modification area along one or more surfaces. In some embodiments, the modification area contains a plurality of microspheres and a pigmented substance (e.g., paint) positioned between an internal layer and a first outer layer of the transaction card. To alter a visual appearance of the transaction card, pressure may be applied to the microspheres and paint (e.g., via a stylus or other hard instrument) to rupture the microspheres and/or disrupt the paint. In some embodiments, the internal layer beneath the modification area may be scratch-resistant and may include a colored and/or patterned upper surface, which changes in appearance as the microspheres and the paint are modified.

Figure 1B:
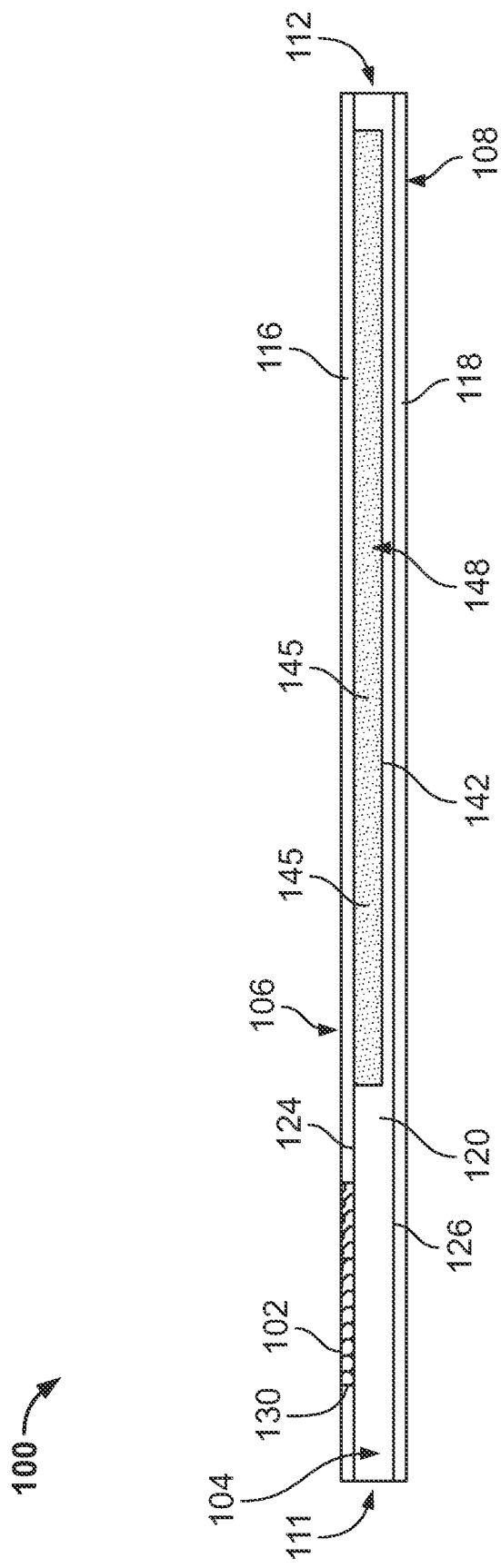
FIG. 1B is a side cross-sectional view along cutline A-A' of FIG. 1 illustrating the transaction card, in accordance with embodiments of the present disclosure.

Referring now to FIGS. 1A-1B, an example transaction card (hereinafter "card") 100 according to embodiments of the disclosure will be described. The card 100 may be a credit or debit card, a RFID passport, or an access card. Although non-limiting, the card 100 may be made from polyvinyl chloride (PVC), polyester, polycarbonate, or metal (e.g., a pure metal or metal alloy). Described sometimes herein as contactless due to the method of communication by an identification chip 102 (hereinafter "chip"), such as an EMV chip or RFID chip, the card 100 may also provide one or more functions requiring contact.

The card 100 may include a body 104 having a first main side 106 opposite a second main side 108. Although non-limiting, the first main side 106 may correspond to a front or top side of the card 100, while the second main side 108 may correspond to a back or bottom side of the card 100. The body 104 may further include a first end 111 opposite a second end 112, and a first side 113 opposite a second side 114.

The card 100 may include multiple layers each having one or more functions. For example, as best shown in FIG. 1B, the body 104 may include a first outer layer 116 extending along the first main side 106, a second outer layer 118 extending along the second main side 108, and an internal layer 120 sandwiched between the first outer layer 116 and the second outer layer 118. In some embodiments, the first outer layer 116 may be directly coupled to an upper surface 124 of the internal layer 120 and the second outer layer 118 may be directly coupled to a lower surface 126 of the internal layer 120. The upper surface 124 of the internal layer 120 may have a variety of different visual features (e.g., colors, designs, logos, etc.). The first outer layer 116 and/or the second outer layer 118 may be transparent in some embodiments. It will be appreciated that the card 100 may include additional layers in other embodiments.

As used herein, the chip 102 may be any microprocessor device configured to exchange data electromagnetically. RFID chips may include a radio frequency inductor, volatile or non-volatile memory storage, a microprocessor, circuitry logic, and/or an antenna. While in some embodiments electromagnetic data communications from RFID chips will take place at radio frequencies, other embodiments may exchange electromagnetic data at different frequencies. Although non-limiting, the chip 102 may be recessed into the first main side 106 of the body 104. Furthermore, the chip may extend through an opening 130 of the first outer layer 116.

Although not shown, the card 100 may further include one or more magnetic stripes provided along the first or second main sides 106, 108 of the body 104. In the embodiment shown, the magnetic stripe may be a part of the second outer layer 118 along the second main side 108. As known, the magnetic stripe may contain cardholder data in accordance with standard protocols.

As further shown, the card 100 may include a modification area 140 along the first main side 106 of the body 104. The modification area 140 may be defined by a recess 142 formed in the internal layer 120, wherein the recess 142 may be covered by the first outer layer 116. In some embodiments, the modification area 140 is uncovered by the first outer layer 116. As shown, the modification area 140 may include a plurality of microspheres 145 and a carrier or pigmented substance 148 (e.g., a paint) disposed within the recess 142. In some embodiments, the microspheres 145 are suspended or disposed within the pigmented substance 148. In other embodiments, the pigmented substance 148 may be contained within an interior of one or more of the microspheres 145. In yet other embodiments, the microspheres 145 may be suspended within a first pigmented substance 148, while a second pigmented substance 148 may be present within an interior of one or more of the microspheres 145. For example, the first and second pigmented substances 148 may be different colored paints or substances, which may mix when the microspheres 145 are ruptured.

In some embodiments, the microspheres 145 may be micro-glass beads that cause a surface to reflect light back to a source of the light. Although non-limiting, the beads may be substantially round, and may be injected or deposited into the pigmented substance 148 by a suitable applicator at a desired rate. The beads may be equally sized and shaped. In other embodiments, the beads are unequally sized and/or shaped. In some embodiments, the pigmented substance 148 may be a paint carrier including a binder selected from the group consisting of acrylic binders, polyurethane binders, polyester binders and epoxy-based binders, and mixtures thereof. In other embodiments, the microspheres may be quartz, plastic, ceramic, or a combination thereof, and may be hollow or solid. Although non-limiting, sizes of the microspheres 145 range from about 1 micron to about 20 microns in diameter, including about 5 microns, 10 microns, and 15 microns. The microspheres 145 may also act as a viscosity modifier, lowering or raising the viscosity of the pigmented substance 148 as desired.

In yet other embodiments, the carrier may be a thermally curable, or heat settable, epoxy or acrylate. The carrier may have a desired amount of flow or flexibility in an initial state, and then may be hardened following a thermal treatment. The thermally curable carrier may be combined or mixed with the paint and the microspheres 145. Once the microspheres 145 have been ruptured and the paint has been modified, the card 100 may be thermally treated to cure the epoxy of the carrier. This may ensure that the microspheres 145 and the paint do not continue to move or mix. In other embodiments, the carrier may be UV curable.

Figure 2:
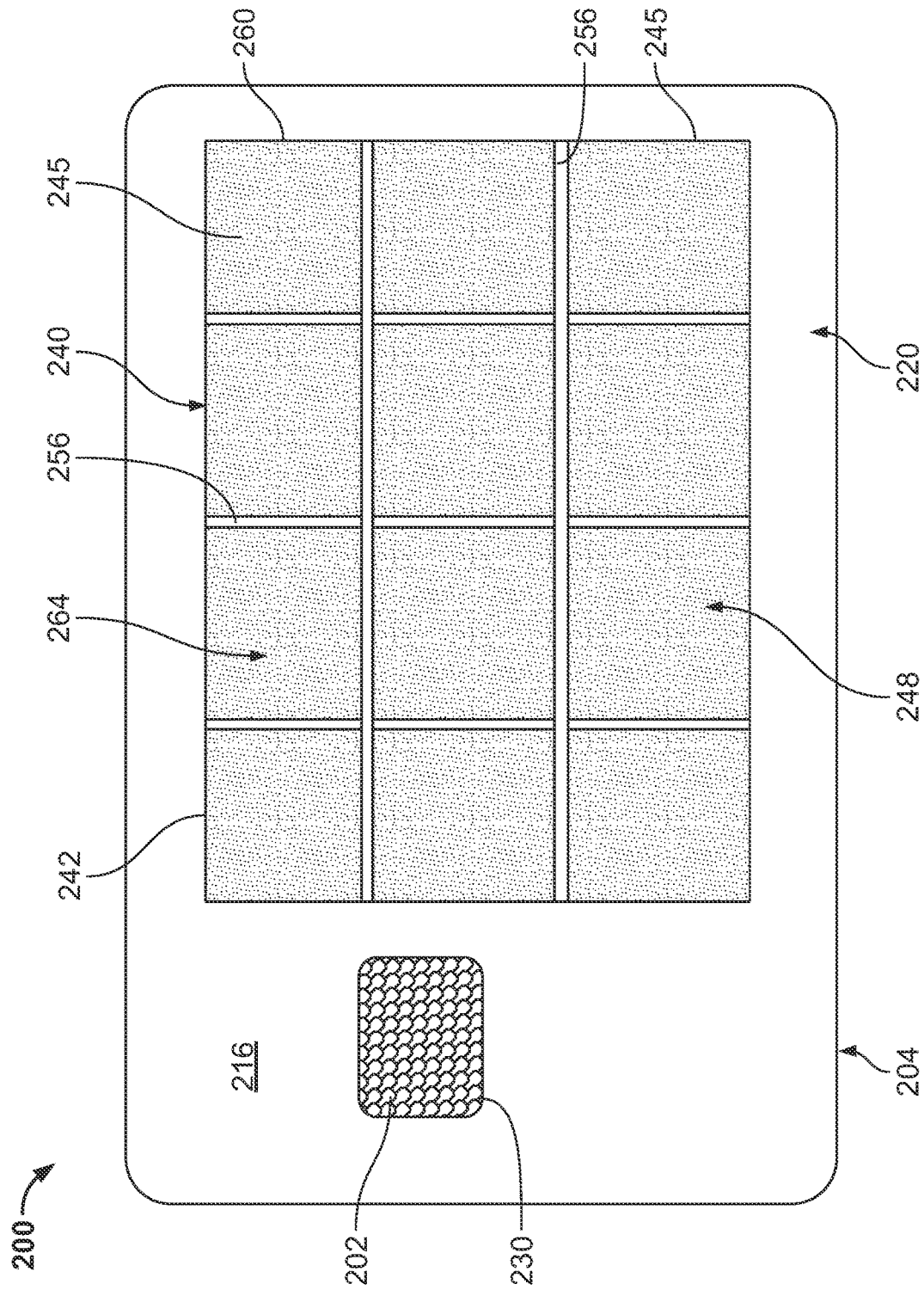
FIG. 2 is a top view illustrating a transaction card, in accordance with embodiments of the present disclosure.

Referring now to FIG. 2, another example transaction card (hereinafter "card") 200 according to embodiments of the disclosure will be described. The card 200 may share many or all of the same features of the card 100 described above. As such, only certain aspects of the card 200 will hereafter be described for the sake of brevity. The card 200 may include a body 204 having a first main side 206 opposite a second main side 208. The card 200 may include multiple layers each having one or more functions. For example, the body 204 may include a first outer layer 216 extending along the first main side 206, wherein a chip 202 extends through an opening 230 of the first outer layer 216. In some embodiments, the first outer layer 216 may be directly coupled to an upper surface of an internal layer 220. The upper surface of the internal layer 220 may have a variety of different visual features (e.g., colors, designs, logos, etc.). The first outer layer 216 and/or the second outer layer may be transparent to display the upper surface of the internal layer 220.

As further shown, the card 200 may include a modification area 240 along the first main side 206 of the body 204. The modification area 240 may be defined by a recess 242 formed in the internal layer 220 of the body, wherein the recess 242 may be covered by the first outer layer 216. As shown, the modification area 240 may include a plurality of microspheres 245 and a carrier or pigmented substance 248 (e.g., a paint) disposed within the recess 242. In some embodiments, the microspheres 245 are suspended or disposed within the pigmented substance 248. In other embodiments, the pigmented substance 248 may be contained within an interior of one or more of the microspheres 245. In yet other embodiments, the microspheres 245 may be suspended within a first pigmented substance 248, while a second pigmented substance 248 may be present within an interior of one or more of the microspheres 245. For example, the first and second pigmented substances 248 may be different colored paints or different substances, which may mix when the microspheres 245 are ruptured.

In this embodiment, the modification area 240 may include one or more dividers 256 extending between the internal layer 220 and an internal surface of the first outer layer 216. An upper surface of the dividers 256 may be directly attached to the first outer layer 216 to fully enclose each area or compartment 264 defined by the dividers 256. As shown, the dividers 256 may extend between a border or perimeter 260 defining the recess 242. Although shown substantially as a uniform grid, it will be appreciated that the dividers 256 may take on virtually any configuration. For example, the dividers 256 may be arranged into a logo or fanciful design. During use, the dividers 256 act as a barrier to restrict movement of the of microspheres 245 and the pigmented substance 248. When the microspheres 245 are ruptured, and the pigmented substance 248 moves together with the microspheres 245, the dividers 256 control the extent to which the microspheres 245 and the pigmented substance 248 may travel across the modification area 240. In some embodiments, the dividers 256 may be transparent to minimize interference with the visual feature(s) of the internal layer 220. In other embodiments, the dividers 256 may have different colors or features, which add to the visual feature(s) of the internal layer 220 and/or the pigmented substance 248.

Figure 3:
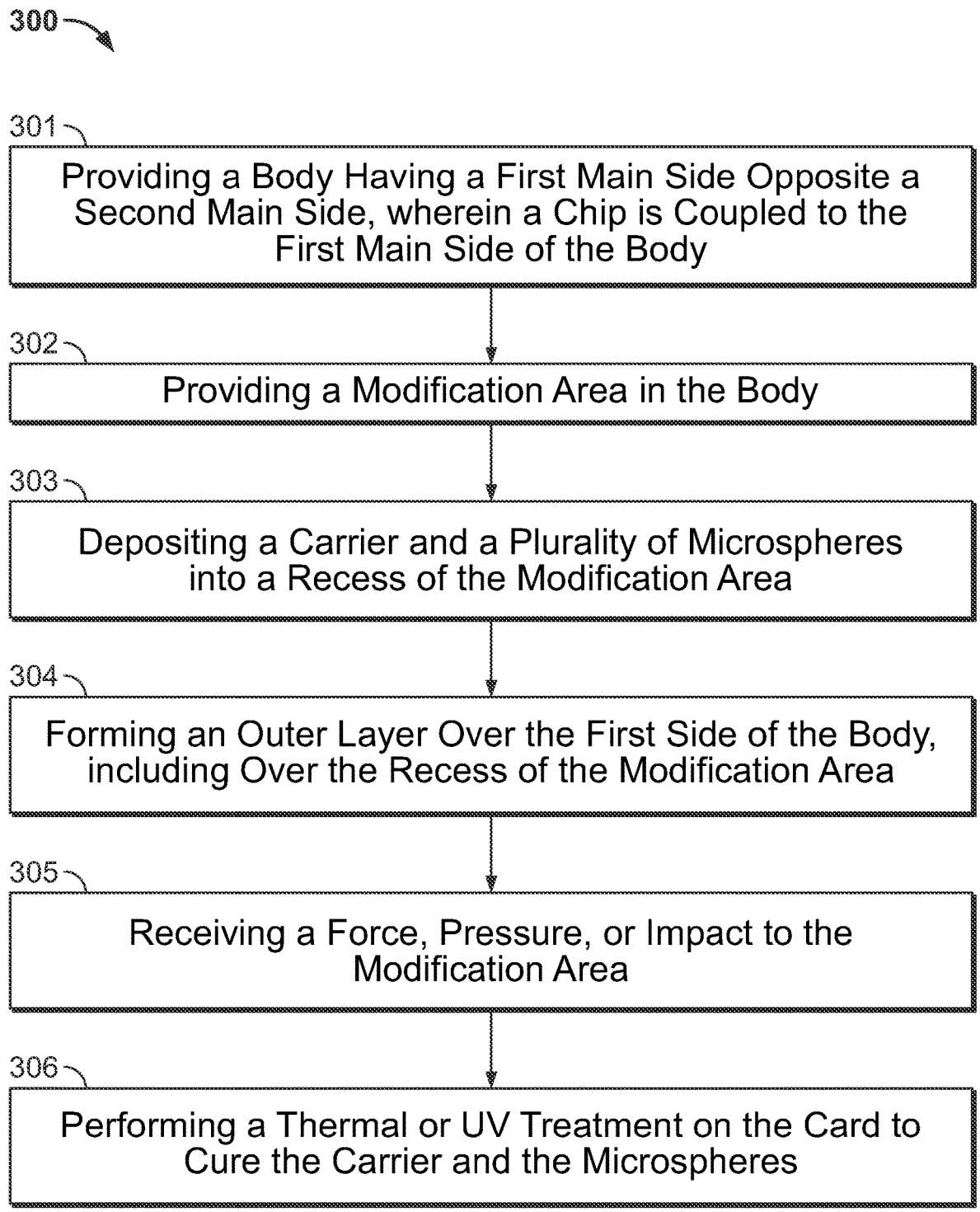
FIG. 3 illustrates a flowchart for performing methods in accordance with embodiments of the present disclosure.

Turning now to FIG. 3, a method 300 according to embodiments of the disclosure will be described in greater detail. At block 301, the method 300 may include providing a body having a first main side opposite a second main side, wherein a chip is coupled to the first main side of the body. In some embodiments, an ID chip (EMV) is coupled to a first main side of the first section.

At block 302, the method 300 may include providing a modification area in the body. In some embodiments, the modification area includes a recess formed into an internal layer of the body. In some embodiments, the modification area includes one or more dividers.

At block 303, the method 300 may include depositing a carrier and a plurality of microspheres into the recess of the modification area. In some embodiments, the microspheres may be micro-glass beads and the carrier may be a pigmented substance, such as a paint. In some embodiments, the carrier may include a thermally curable epoxy.

At block 304, the method 300 may include forming an outer layer over the first side of the body, including over the recess of the modification area. In some embodiments, the outer layer encloses the carrier and the microspheres.

At block 305, the method 300 may include receiving a force, pressure, or impact to the modification area. In some embodiments, a stylus or other instrument may be pressed against the outer layer to apply a force to the carrier and the microspheres. When sufficient pressure is applied, the microspheres may rupture. In some embodiments, the outer layer is not formed over the modification area, and the stylus or instrument may be applied directly against the carrier and the microspheres.

At optional block 306, a thermal or UV treatment may be performed on the card to cure the carrier and the microspheres. As such, a desired pattern, color, or design may be made more permanent.

The foregoing discussion has been presented for purposes of illustration and description and is not intended to limit the disclosure to the form or forms disclosed herein. For example, various features of the disclosure may be grouped together in one or more aspects, embodiments, or configurations for the purpose of streamlining the disclosure. However, it should be understood that various features of the certain aspects, embodiments, or configurations of the disclosure may be combined in alternate aspects, embodiments, or configurations. Moreover, the following claims are hereby incorporated into this Detailed Description by this reference, with each claim standing on its own as a separate embodiment of the present disclosure.

The use of "including," "comprising," or "having" and variations thereof herein is meant to encompass the items listed thereafter and equivalents thereof as well as additional items. Accordingly, the terms "including," "comprising," or "having" and variations thereof are open-ended expressions and can be used interchangeably herein.

The phrases "at least one", "one or more", and "and/or", as used herein, are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Furthermore, identification references (e.g., primary, secondary, first, second, third, fourth, etc.) are not intended to connote importance or priority, but are used to distinguish one feature from another. The drawings are for purposes of illustration only and the dimensions, positions, order and relative sizes reflected in the drawings attached hereto may vary.

Although non-limiting, the cards 100 and 200 described herein may have standardized dimensions. For example, ISO/IEC 7816 is an international standard related to electronic identification cards with contacts, especially smart cards, managed jointly by the International Organization for Standardization (ISO) and the International Electrotechnical Commission (IEC). There are other standards, however, such as ISO/IEC 14443 for contactless cards (PayPass, PayWave, ExpressPay). A further standard ISO/IEC 7810 ID-1, with which most credit cards are compliant, defines dimensions as 85.60×53.98 mm (3.370×2.125 in) and a thickness of 0.76 mm (0.030 in).

Furthermore, the terms "substantial" or "substantially," as well as the terms "approximate" or "approximately," can be used interchangeably in some embodiments, and can be described using any relative measures acceptable by one of ordinary skill in the art. For example, these terms can serve as a comparison to a reference parameter, to indicate a deviation capable of providing the intended function. Although non-limiting, the deviation from the reference parameter can be, for example, in an amount of less than 1%, less than 3%, less than 5%, less than 10%, less than 15%, less than 20%, and so on.

Still furthermore, although the illustrative method 300 is described above as a series of acts or events, the present disclosure is not limited by the illustrated ordering of such acts or events unless specifically stated. For example, some acts may occur in different orders and/or concurrently with other acts or events apart from those illustrated and/or described herein, in accordance with the disclosure. In addition, not all illustrated acts or events may be required to implement a methodology in accordance with the present disclosure. Furthermore, the method 300 may be implemented in association with the formation and/or processing of structures illustrated and described herein as well as in association with other structures not illustrated.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, the present disclosure has been described herein in the context of a particular implementation in a particular environment for a particular purpose. Those of ordinary skill in the art will recognize the usefulness is not limited thereto and the present disclosure may be beneficially implemented in any number of environments for any number of purposes. Thus, the claims set forth below are to be construed in view of the full breadth and spirit of the present disclosure as described herein.

What is claimed is:

1. A transaction card, comprising:
a body having a first main side opposite a second main side, wherein a chip is coupled to the first main side of the body, wherein a first outer layer extends along the first main side, and wherein a second outer layer extends along the second main side; and
an internal layer between the first and second outer layers; and
a plurality of microspheres and a carrier positioned between the internal layer and the first outer layer, wherein the plurality of microspheres are solid, wherein the carrier is curable to prevent movement of the plurality of microspheres within the carrier, an application of a pressure or an impact to the body to move one or more of the plurality of microspheres within the internal layer to alter a visual appearance of the internal layer through at least one of the outer layers prior to curing the carrier.

2. The transaction card of claim 1, wherein the plurality of microspheres are suspended within the carrier.

3. The transaction card of claim 1, further comprising a plurality of dividers extending between the internal layer and an internal surface of the first outer layer, wherein the plurality of dividers are operable to restrict movement of the plurality of microspheres and the carrier.

4. The transaction card of claim 1, wherein the carrier is a heat settable epoxy.

5. The transaction card of claim 1, wherein the chip extends through an opening in the first outer layer.

6. The transaction card of claim 1, wherein each microsphere of the plurality of microspheres is a micro-glass bead.

7. The transaction card of claim 6, wherein the internal layer comprises a recess, and wherein the plurality of microspheres and the carrier are contained within the recess.

8. The transaction card of claim 1, wherein the first outer layer is transparent.

9. A transaction card, comprising:
a body having a first main side opposite a second main side, wherein an identification chip is coupled to the first main side of the body, wherein a first outer layer extends along the first main side, and wherein a second outer layer extends along the second main side; and
an internal layer between the first and second outer layers, wherein the internal layer defines a modification area; and
a plurality of microspheres and a pigmented coating located in the modification area, wherein the plurality of microspheres are solid, wherein the pigmented coating is curable to prevent movement of the plurality of microspheres within the pigmented coating, an application of a pressure or an impact to the modification area to move one or more of the plurality of microspheres within the internal layer to alter a visual appearance of the internal layer through at least one of the outer layers prior to curing the pigmented coating.

10. The transaction card of claim 9, wherein the modification area comprises a recess in the internal layer, wherein the plurality of microspheres and the pigmented coating are contained within the recess, and wherein the first outer layer extends over the recess.

11. The transaction card of claim 9, wherein the plurality of microspheres are suspended within the pigmented coating.

12. The transaction card of claim 9, the modification area comprising a plurality of dividers operable to restrict movement of the plurality of microspheres and the pigmented coating.

13. The transaction card of claim 9, further comprising a heat settable epoxy between the internal layer and the first outer layer.

14. The transaction card of claim 9, wherein the identification chip extends through an opening in the first outer layer, and wherein the first outer layer is transparent.

15. A customizable transaction card, comprising:
a body having a first main side opposite a second main side, wherein a chip is coupled to the first main side of the body, wherein a first outer layer extends along the first main side, and wherein a second outer layer extends along the second main side; and
an internal layer between the first and second outer layers; and
a plurality of glass microspheres and a pigmented coating positioned between the internal layer and the first outer layer, wherein the plurality of microspheres are solid, wherein the pigmented coating is curable to prevent movement of the plurality of microspheres within the pigmented coating, an application of a pressure or an impact to the body to move one or more of the plurality of microspheres within the internal layer to alter a visual appearance of the internal layer through at least one of the outer layers prior to curing the pigmented coating.

16. The customizable transaction card of claim 15, wherein the plurality of glass microspheres are suspended within the pigmented coating.

17. The customizable transaction card of claim 15, wherein the internal layer comprises a recess, wherein the plurality of glass microspheres and the pigmented coating are contained within the recess, and wherein the first outer layer encloses the recess.

18. The customizable transaction card of claim 17, further comprising a plurality of dividers within the recess, between the internal layer and an internal surface of the first outer layer, wherein the plurality of dividers are operable to restrict movement of the plurality of glass microspheres and the pigmented coating.

19. The transaction card of claim 1, wherein the first outer layer and the second layer are transparent.

20. The transaction card of claim 9, wherein at least one of the first outer layer and the second layer are transparent.

* * * * *